Nov. 3, 1936.   J. C. KOPF   2,059,249
GRANULATING APPARATUS
Filed March 10, 1934   7 Sheets-Sheet 1

Fig.1.

INVENTOR
John C. Kopf
BY
ATTORNEY

Nov. 3, 1936. J. C. KOPF 2,059,249
GRANULATING APPARATUS
Filed March 10, 1934 7 Sheets-Sheet 2

INVENTOR
John C. Kopf
BY
ATTORNEY

Nov. 3, 1936.　　　　J. C. KOPF　　　　2,059,249
GRANULATING APPARATUS
Filed March 10, 1934　　　7 Sheets-Sheet 3

INVENTOR
JOHN C. KOPF
BY
ATTORNEY

Nov. 3, 1936.   J. C. KOPF   2,059,249
GRANULATING APPARATUS
Filed March 10, 1934   7 Sheets-Sheet 4

INVENTOR
JOHN C. KOPF
BY
ATTORNEY

Nov. 3, 1936.  J. C. KOPF  2,059,249
GRANULATING APPARATUS
Filed March 10, 1934  7 Sheets-Sheet 6

INVENTOR
JOHN C. KOPF
BY
ATTORNEY

Nov. 3, 1936.　　　　J. C. KOPF　　　　2,059,249
GRANULATING APPARATUS
Filed March 10, 1934　　　7 Sheets-Sheet 7

Fig. 15.

INVENTOR
JOHN C. KOPF
BY
ATTORNEY

Patented Nov. 3, 1936

2,059,249

UNITED STATES PATENT OFFICE 2,059,249

GRANULATING APPARATUS

John C. Kopf, New York, N. Y., assignor to Jabez Burns & Sons, Inc., New York, N. Y., a corporation of New York Application March 10, 1934, Serial No. 714,929

10 Claims. (Cl. 83—18)

This invention relates to machine and method for granulating roasted coffee and preparing it as a suitable product for producing a satisfactory beverage.

The coffee fruit, generally, consists of two parts, each containing a single seed or bean. These beans are flattened laterally and fit together, except in certain instances.

The coffee bean with which the consumer is familiar, is only a small part of the fruit. The fruit, which is the size of a small cherry, has, like the cherry, an outer fleshy portion called the "pericarp". Beneath this is a part like tissue paper, spoken of technically as the "parchment", but known scientifically as "endocarp". Next in position to this, and covering the entire seed or bean, is the so-called "spermoderm", which means the seed skin, and is referred to in the trade as the silver skin. This skin or covering, surrounds the entire bean and extends into the cleft thereof.

The processes for preparing the green coffee for roasting need not here be described. When the coffee is ready for roasting, the pericarp, the endocarp and the spermoderm have been removed excepting that portion of the spermoderm which extends into the cleft of the bean; and this portion cannot be removed as it is tightly embedded in the fold of the cleft. After the coffee is roasted the spermoderm embedded in the cleft has become a very light, flaky, highly fragile material. In this form it is known in the trade as "chaff". Roasted coffee must be broken up into fairly small pieces to release all of the imprisoned chaff which is in fairly large light flakes.

It is recognized among coffee experts and analysts that there are two different methods of determining the different qualities of coffee. One of these is by analytical methods which have been developed in the chemical laboratory, the other by the so-called organoleptic tests based on sensory reactions; the appearance, the odor or aroma, and the taste or flavor. For coffee, analytical tests alone are insufficient and are relied on for the determination of certain ingredients and for extractive data, and quality, as used in its generally accepted sense, can be ascertained only by the application of sensory tests either before or after it has been subjected to some form of treatment to bring it into the condition in which it is ordinarily employed.

The appearance of the coffee after it has been granulated and prepared for beverage purposes should be clean cut and uniform in color and in distribution of the various sizes of granules. The beverage must be clear and of the desired color and the flavor and the aroma must conform to certain arbitrary standards. Flavor and aroma are largely factors of proper roasting but are very easily injured by improper granulating and preparing of the roasted beans for beverage purposes.

When coffee is ground by the ordinary method, the chaff is somewhat broken up but due to its flaky characteristics appears in the finished product in streaks or strata. This is objectionable, first; because the finished product has a poor appearance and, second; because of its nonuniformity as a beverage product. A strong infusion of chaff has a disagreeable acrid flavor. Small quantities of chaff in well made beverage coffee contribute a not unpleasant bitterness which blends well with the other ingredients composing the elusive and easily ruined flavor. It adds a piquancy and acts condimentally, while large amounts overbalance the finer flavoring principles or ethereal compounds and quickly depreciate the flavoring value. Because of the unequal distribution of chaff throughout the mass of granulated coffee, and for the purpose of improving the appearance of the finished coffee, it has been the custom in the trade to remove the chaff from the coffee and throw it away. This resulted not only in the production of a coffee of somewhat inferior beverage properties, but also resulted in a decided loss, as chaff constitutes from 1% to 2% in the weight of coffee depending upon where the coffee is grown.

Roasted coffee is a very brittle substance and if roughly handled readily breaks into small pieces. To secure the best results in any of the different methods of brewing coffee such as the pot, percolator or drip method, it is necessary that the ground coffee contain a definte proportion of various size granules for each particular method. The proper proportions of different size of granules in coffee are determined by various methods which need not here be described.

Besides improving the flavor and aroma of coffee as a beverage, chaff plays an important function in the brewing of coffee by both the percolator and drip processes. In these processes the prepared coffee is not boiled in water but is placed in a separate container and acted upon by water at or near the boiling point, the water passing through the mass of prepared coffee and into a pot or container. In either of these methods, the chaff aids by forming a mat or filtration pad.

It can therefore be readily seen that to produce a beverage of uniform quality, flavor, and aroma from any coffee, it is essential that the proper percentages of different sizes of granules are present and also that the percentage of chaff throughout the entire batch of prepared coffee be uniform.

It is well known in the trade that if granulated coffee and chaff be gently rubbed between the palms of the hands, the chaff will be cut up by the action of the granular coffee on the chaff. It is also well known that if this rubbing is continued for a little while chaff will become coated with the oil of coffee which has been exposed by the breaking up of the coffee beans. When the chaff is in this finely divided condition and coated with the coffee oil, some of it will adhere to the coffee granules while other parts thereof will become covered with very fine coffee particles which are almost as fine as dust. In this condition it is readily blended with the granular coffee and has no tendency to lie in streaks or become stratified. Therefore, it follows that a beverage brewed from coffee prepared in this manner will be uniform in quality, strength and aroma throughout the entire batch of coffee.

When granulated coffee is beaten or violently agitated in an endeavor to cut up or break up the chaff, the edges of the ground coffee are broken or chipped off, producing a high percentage of coffee dust or fine. When coffee is brewed by the pot or boiling method from granulated coffee containing a high percentage of fine, it results in a beverage having a muddy appearance and inferior in flavor because of the large quantity of fine insoluble solids held in suspension. In the case of coffee brewed by percolating or drip methods, the excessive fine forms a mat of such density as to retard the flow of water, at or near the boiling point, through the mass of prepared coffee so that not only the oils and fats are extracted from the granulated coffee but also the other constituents which detract from the flavor and aroma of the beverage.

If in addition to being violently agitated the mixture of granulated coffee and chaff is subjected to a pressure, the product has a fuzzy appearance; and the pressure releases volatile, essential oils of coffee which results in more rapid deterioration of such granulated coffee.

I have discovered that if streams of comminuted coffee containing chaff, moving in opposite directions, or in the same direction at different velocities, be made to intersect or act upon each other, the result is the same as produced by gently rubbing coffee and chaff between the palm of the hands. The chaff is cut up by the action of the sharp edges of the granulated coffee and coated with the exposed oil. The resultant product is substantially homogeneous, will contain a uniform proportion of the various sizes of granules, and will also contain the same percentages of chaff as is found in the original unground bean.

I have also discovered that if roasted coffee is cracked in particles sufficiently small to liberate all of the imprisoned chaff, that if this liberated chaff is acted upon by the relatively coarse pieces of coffee, the resultant finished product has a better, more clean-cut appearance, and has decided advantages from the point of view of "eye appeal".

The object of the present invention is to provide a machine wherein the roasted coffee beans are broken or cracked, wherein the cracked coffee is made to act upon the liberated chaff, wherein the cracked coffee is then granulated to a desired fineness, and wherein comparatively thin streams of granulated coffee containing chaff are made to move to cause the granulated coffee and the chaff to act upon each other by their relative contacting movement, all in a single operation.

A further object is to provide a machine which may be rapidly and accurately set for any fineness or granulation and which will consistently produce and reproduce such granulations.

Another object is to provide a machine wherein small batches of roasted coffee may be granulated and prepared and which shall completely clean out at the end of each operation or batch.

These and other objects and advantages of the invention will be described in connection with the accompanying drawings, in which.

Figure 1:
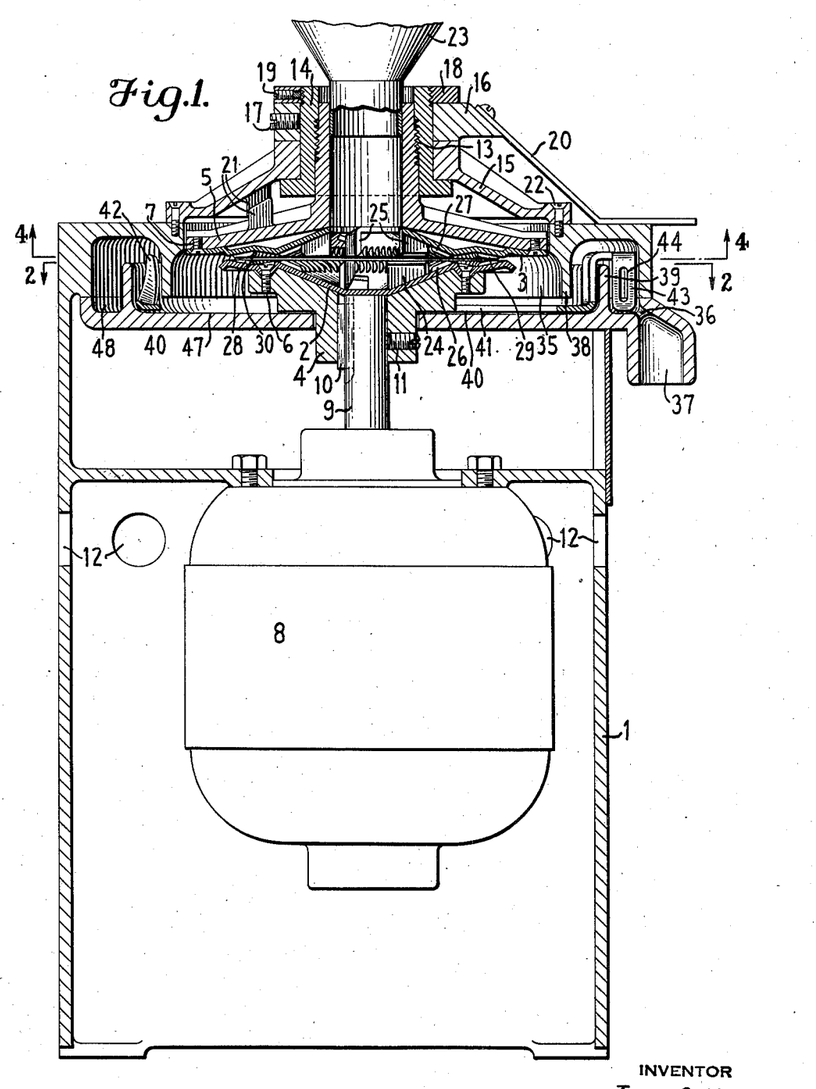
Fig. 1 is a vertical section through the machine.
Figure 2:
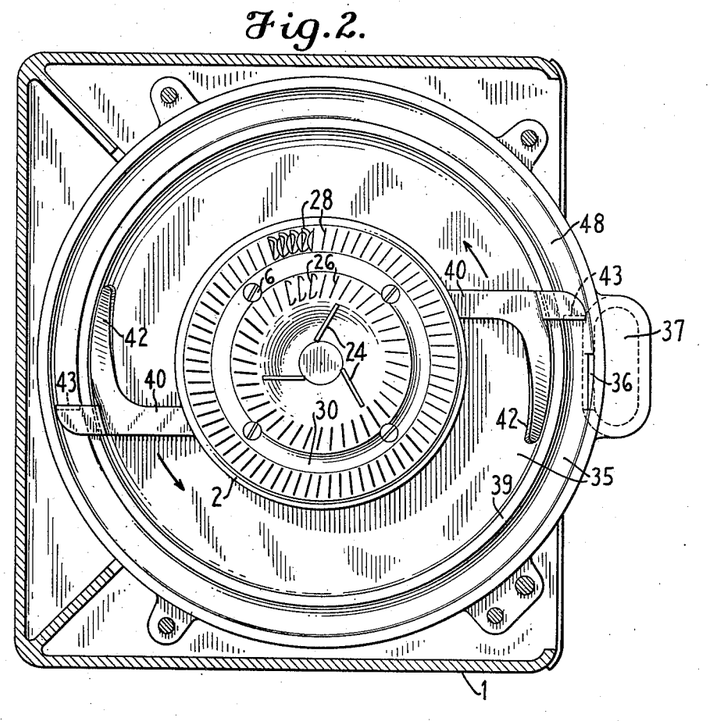
Fig. 2 is a horizontal section on line 2—2 of Fig. 1, showing one of the granulating elements and coffee treating mechanism.
Figure 3:
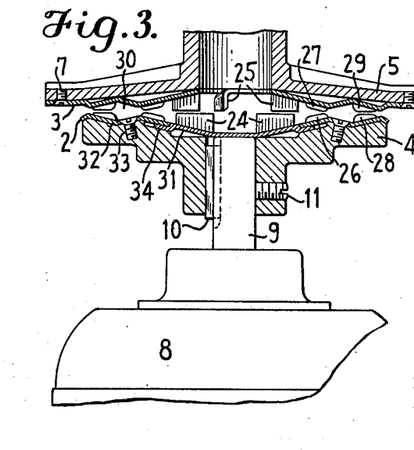
Fig. 3 is a vertical section of a modification of the rotatable granulating element.
Figure 4:
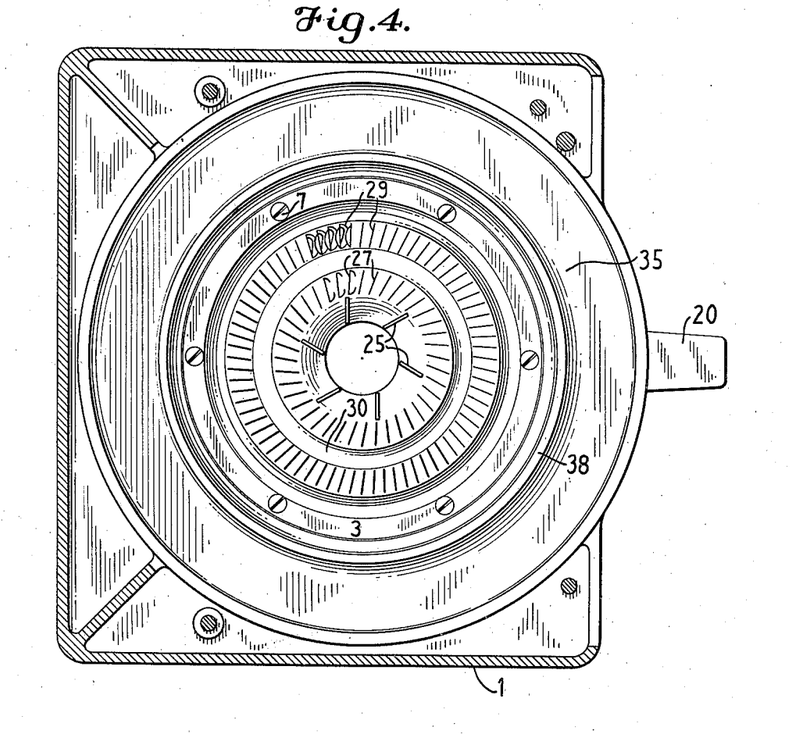
Fig. 4 is a horizontal section on line 4—4 of Fig. 1, showing the fixed granulating element which cooperates with that shown in Fig. 2.
Figure 5:
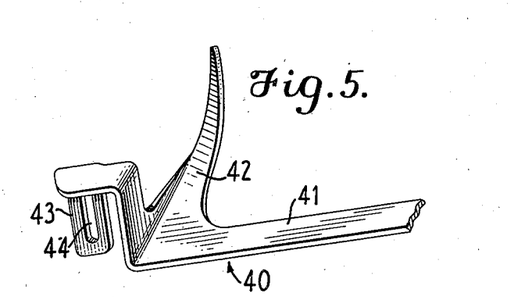
Fig. 5 is a perspective view showing the construction of one form of coffee treating elements.

The machine shown in Figs. 1 to 5 and Fig. 12 has a casing or frame 1 containing cooperating granulating elements 2 and 3 which in this instance are in the form of plates mounted horizontally within the frame. These plates are secured to carriers 4 and 5 respectively, by screws 6 and 7, as shown in Figs. 1, 2 and 4.

Granulating plate 2 is rotated by motor 8 having its shaft 9 secured to plate carrier 4 by key 10 and set screw 11, rotation being in the direction of the arrow in Fig. 2. The motor may be ventilated by providing suitable openings 12 leading into the side of the frame 1 as shown in Fig. 1. Granulating plate 3 is stationary but adjustable toward and away from plate 4 to vary the fineness of the grind and to compensate for plate wear.

To provide such adjustment, the hollow shank of plate carrier 5 is externally threaded at 13 to sleeve 14 which is rotatably mounted in a support 15 on the top of the frame 1. Sleeve 14 carries an upper collar 16, which is secured thereto by set screw 17, and a nut 18 which is secured to the top of the sleeve by set screw 19. Collar 16 carries a control member such as a lever 20 extending beyond the frame 1. Movement of this lever to the right or left, as viewed in Fig. 12, rotates sleeve 14 and causes plate 3 to move toward or away from plate 2, cooperating lugs 21 on plate carrier 5 and support 15 preventing said plate carrier from rotating. The adjustment of this mechanism to provide a plurality of different grinds, and to compensate for plate wear, will hereinafter be described.

Figure 12:
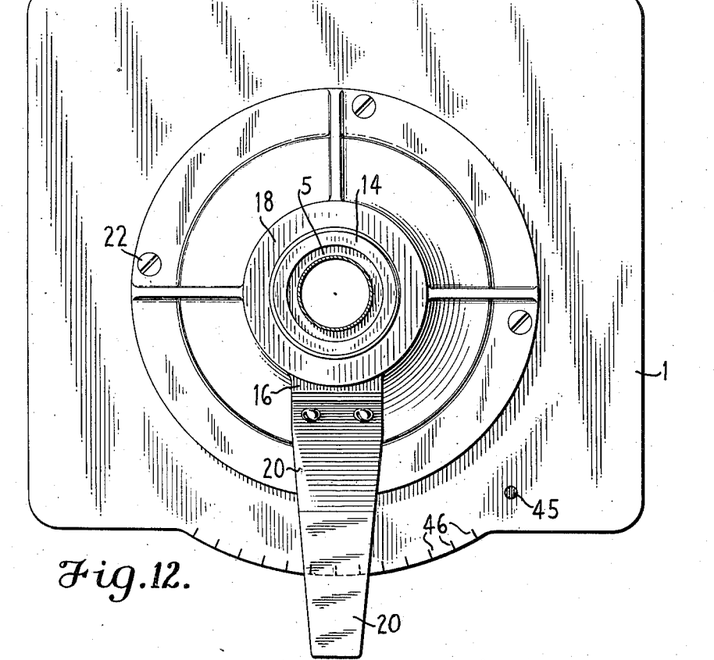
Fig. 12 is a plan view of the mechanism for adjusting the granulating elements.

Support 15 with the entire plate adjusting mechanism is secured to the frame 1 by suitable screws 22 as shown in Figs. 1 and 12. By removing the screws 22 the support 15 together with all of the plate adjusting mechanism may be removed from the machine. A hopper 23 is mounted in any suitable manner, its snout extending into the hollow shank of plate carrier 5 for feeding the coffee beans to the granulating element.

Granulating plates 2 and 3 are provided with feeding or conveying and breaker flights 24 and 25 respectively, and with a plurality of cooperating circular sets of teeth 26, 27 and 28, 29 as shown in Figs. 1 to 4. These sets of teeth are arranged in concentric circles, the inner sets 26 and 27 comprising relatively widely spaced teeth for cracking the coffee, and the outer sets 28 and 29 comprising relatively closely spaced teeth for finishing the granulation.

The respective inner and outer concentric sets of teeth are separated by a dished annular space 30. Coffee, in the bean, coming from the hopper 23 through its spout, is first engaged by the feeder and breaker flights 24, 25 where the coffee beans are broken up into large pieces and conveyed into the bite of the cracker teeth 26, 27. Here the broken up coffee is reduced to entirely liberate the imprisoned chaff. From the cracker teeth the cracked coffee and chaff pass into the annular space 30. There being no conveyor flights in this space, the cracked coffee and chaff fill the space and are then acted upon by coffee and chaff coming from the cracker teeth. This action cuts up the chaff and causes the cracked coffee and chaff to flow into the bite of the finisher teeth 28, 29.

This invention is not limited to two sets of teeth, as for some classes of work the use of three or even more spaced sets of concentric rows of teeth may be desirable to obtain the desired gradual reduction of size of coffee granules.

Occasionally stones, nails, and other foreign hard objects enter the machine through the hopper 23 together with the coffee. To prevent injury to the plates or granulating elements by such foreign hard objects, modified grinding elements such as are illustrated in Fig. 3 may be adopted. In this figure, the lower granulating element is made in two sections comprising an inner disk 31 containing the flights 24 and an outer annular section 32 containing teeth 26 and 28. Section 32 is secured to plate carrier 4 by screws 33 and the inner edge of such section overlaps the peripheral edge of disk 31, thereby forming a frictional joint 34 with the disk which is not otherwise secured to the plate carrier. If a hard foreign object becomes wedged between flights 24—25 the wedging action will stop the rotation of disk 31 and interrupt the flow of goods to the cracker teeth. The operator, noting the interruption, may stop the machine, remove cover support 15 and the associated adjusting mechanism of plate 3 as described above, and remove the foreign object which caused the clogging.

After the coffee has passed through the finisher granulating teeth, it is discharged into an annular chamber 35. Chamber 35 has a peripheral discharge opening 36 leading to a spout 37 and has spaced annular barriers 38 and 39 which extend inwardly from opposite sides of the chamber between the granulating plates and the discharge opening 36 as shown in Figs. 1 and 2. Hence, the granulated goods thrown outwardly by the granulating plates must pass under barrier 38 and over barrier 39 before being discharged through opening 36 and spout 37. To accomplish this, one or more arms or fliers 40 are provided, which are secured to the rotatable plate carrier 4, two such arms being shown for purpose of illustration in Figs. 1 and 2. These arms, which are alike, are flat and straight at 41, have a plough-shaped extension 42 between barriers 38 and 39 and a flat pusher extension 43 outwardly of barrier 39, the construction of the arms being clearly shown in Fig. 5. The pusher 43 may have an aperture 44.

The size of the finished granulated coffee produced by the machine depends upon the spacing of granulating plates 2 and 3. When adjusting the plates in the first instance, or at any time to compensate for wear, set screw 17 is loosened and collar 16 is rotated by lever 20 until said lever 20 strikes pin 45 shown in Fig. 12. Nut 18 is rotated until plates 2 and 3 just click, lever 20 still being held in contact with pin 45. Nut 18 is then backed up to just clear the plates. With the parts in this position, set screw 17 is tightened to sleeve 14. Thereafter, movement of lever 20 to the left, as viewed in Fig. 12, causes separation of the granulating plates. Suitable graduations 46 as shown in Fig. 12 may be provided to indicate predetermined sizes of granulated coffee.

Granulating elements 2 and 3 having been adjusted to produce the desired fineness of finished goods, the operation of the machine is as follows: Coffee in the bean, passes from hopper 23 through the hollow shank of the fixed plate carrier 5 into the bite of the breaker and conveyor flights 24 and 25, through the cracker teeth 26, 27, annular space 30, finisher teeth 28, 29, whence it is discharged into that part of the annular chamber 35 lying within the depending barrier 38. The granulated coffee and chaff fall to the bottom 47 of the annular chamber 35 where it is engaged by the flat portions 41 of the arms or fliers 40. This flat portion 41 sets up a motion in a thin stream of coffee corresponding to the thickness of such flat portion, such motion being rotary due to the rotation of the arms 40 and also outward along the leading edge of the flat portion 41. This thin layer of coffee in its combined rotary and straight-line motion acts upon the accumulated coffee lying upon it, effecting further reduction of the chaff by means of the sharp edges of the granulated coffee. A mass or bulk of coffee is caused to accumulate in chamber 35 by the depending barrier 38 as only a stream of the thickness between the lower face of the barrier 38 and the bottom 47 of the annular chamber 35 can pass through this narrow opening into the space between the barrier 38 and the barrier 39. Coffee passing under the barrier 38 after having been treated in chamber 35 for further reduction of chaff continues to move along the leading edge of the arms 40 until it impinges on the inner face of the barrier 39 whereupon it is plowed upward and outwardly by the plow-shaped members 42 of the arms 40 to form streams which further reduce the chaff by the relatively different speeds of the contacting ground material. After the coffee has been plowed over the barrier 39 it falls into a circular channel or furrow 48 where it is given a circular motion by the pusher 43, some of the coffee being rotated in the furrow, some of it passing out through the opening 36 and some of it passing through the aperture 44 in the pusher. The action being continuous as long as coffee is passing through the plates, successive ridges of coffee, at low velocity, are laid upon the stream of coffee being rapidly rotated in the furrow 48. This continuous action of relatively thin streams of coffee intersecting and acting upon each other by portions moving at relatively different speeds cause the chaff to become further reduced and coated with the oil of coffee and either adhere to the larger granules of coffee or become entirely coated with the very fine granules of coffee and at the same time causes the entire coffee to become thoroughly mixed so that the finished product as discharged from the spout 37 will at all times contain a uniform percentage of the various sized granules as well as of chaff. Owing to the discharge opening 36 being restricted as shown in the drawings, a mass or bulk of the treated material is caused to accumulate in chamber or furrow 48 for securing the above further action and treatment.

Figures 6, 8:
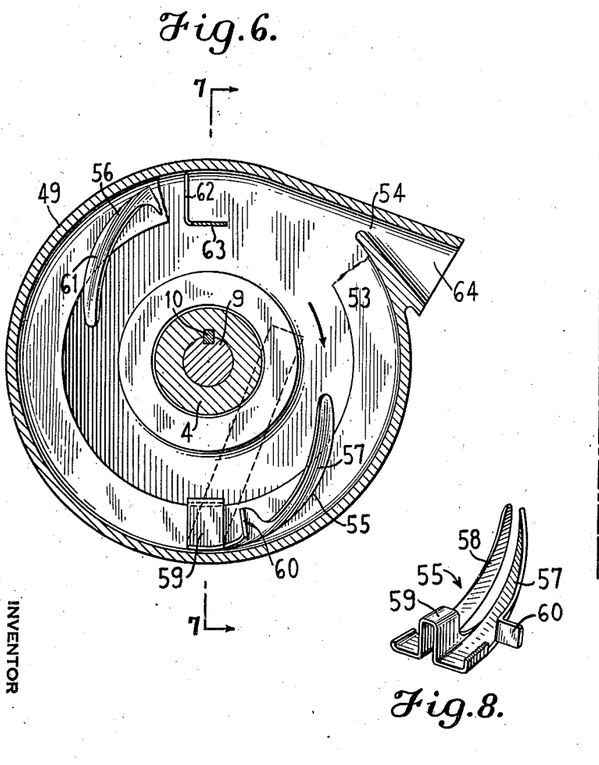
Fig. 6 is a longitudinal section on line 6—6 of Fig. 7 showing a machine having a horizontal motor and vertical granulating elements.
Fig. 8 is a perspective view of one of the coffee treating elements shown in Figs. 6 and 7.
Figure 7:
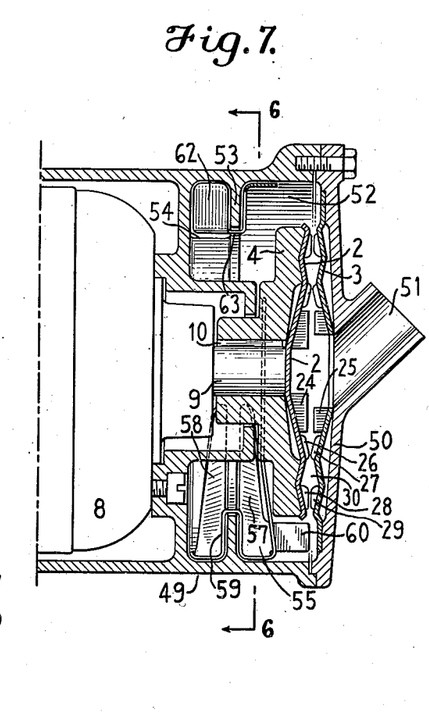
Fig. 7 is a vertical section on line 7—7 of Fig. 6.

Figs. 6 to 8 show a modification of the invention, in which motor 8 is mounted horizontally and granulating elements 2 and 3 are mounted vertically within a cylindrical casing 49. Granulating element 2 is rotated by motor 8 as previously described, while stationary plate 3 is screwed or otherwise secured to the head 50 which has an inlet passage 51 for connection to the feed hopper. Coffee treating chamber 52 has an annular barrier 53 which extends inwardly between the granulating elements and tangential discharge opening 54 which is formed adjacent to the top of the casting as shown in Fig. 6. Granulated coffee and chaff are caused to act upon each other in chamber 52 by arms or fliers 55 and 56 which are secured to the rotatable granulating plate carrier 4 as in Figs. 1 and 2 but differ structurally from the fliers previously described.

Flier 55 has two plough shaped extensions 57 and 58 which lie on opposite sides of the barrier 53 and are connected by U-link 59 which straddles the barrier. It also has a paddle-like extension 60 which rotates adjacent to the peripheral edge of the granulating elements and sweeps the granulated goods toward the plough 57. Said plough 57 is curved more abruptly than plough 58 in order to throw the goods beyond barrier 53 while plough 58 is flatter to avoid returning the bulk of the goods across the barrier. Flier 56 has a single plough shaped extension 61 which is on the same side of the barrier as plough 57 and is curved like plough 57. It also has a paddle-like extension 62 which lies on the opposite or discharge side of barrier 53 and is connected to plough 61 by a U-shaped link 63 which straddles the barrier, paddle 62 being in reasonably close running contact with the barrier and the adjacent wall of casing 49 so as to move the finished goods through discharge opening 64. As in the machine previously described, partial reduction of the chaff is accomplished by the rubbing action which takes place in the annular space 30 between the cracker and finishing teeth of granulating plates 2 and 3. Further and complete reduction of the chaff and the treatment of such chaff with the oil of coffee is accomplished by fliers 55 and 56 which cause streams of coffee to intersect each other and cause a complete treatment and thorough mixing of the coffee and chaff as well as the various sizes of granules before the product is discharged by paddle 62 through discharge opening 64.

Figure 9:
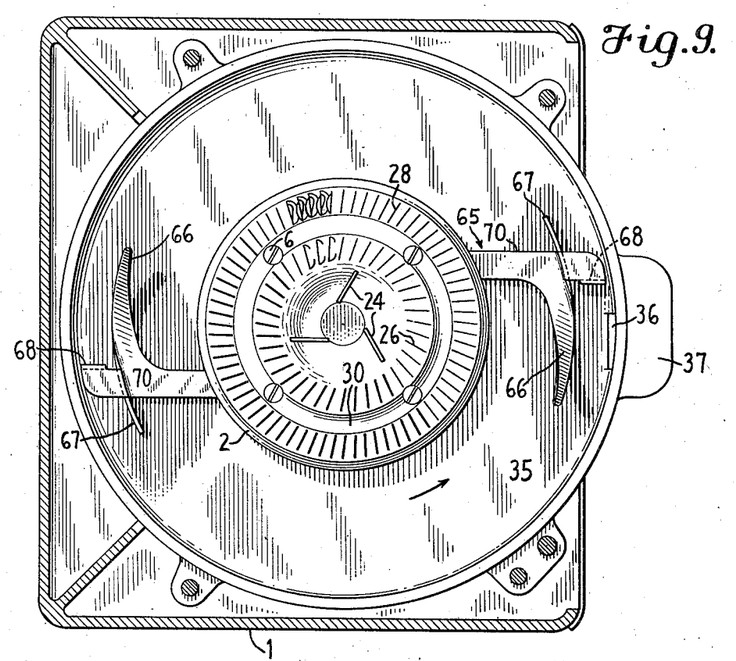
Fig. 9 is a horizontal section similar to Fig. 2 but having a modified form of coffee treating mechanism.
Figure 10:
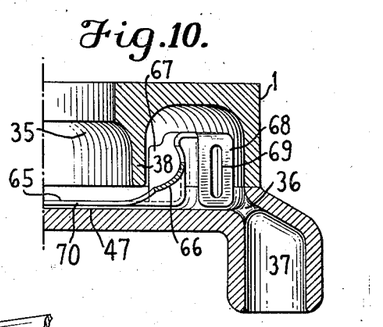
Fig. 10 is a fragmentary vertical section through the coffee treating mechanism of Fig. 9.
Figure 11:
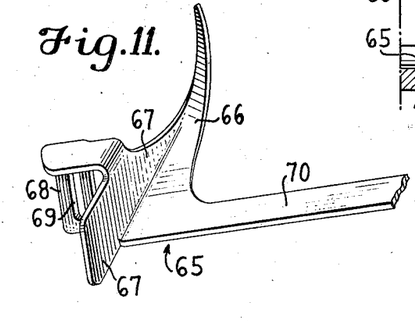
Fig. 11 is a perspective view showing the construction of one of the coffee treating elements of Figs. 9 and 10.

Figs. 9 to 11 show a modified chaff reducing and coffee treating mechanism which differs from that shown in Figs. 1, 2 and 4 in that annular chamber 35 has only one barrier 38, (barrier 39 being omitted) and that the fliers are of modified construction. In this form of the invention it is simply necessary to carry the goods under barrier 38 into the region of peripheral discharge opening 36. To accomplish this fliers 65 are provided having plough shaped extensions 66, vertical baffles 67, and pushers 68. Pushers 68 are provided with apertures 69. The fliers are also provided with a flat portion 70.

In this type of coffee treating mechanism, coffee in the bean passes from hopper 23 through the hollow shank of the fixed plate carrier 5 into the bite of the breaker and conveyor flights 24 and 25, through the cracker teeth 26, 27, annular space, finisher teeth 28, 29, whence it is discharged into that part of the annular chamber 35 lying within the depending barrier 38. The granulated coffee and chaff fall to the bottom 47 of the annular chamber 35 where it is engaged by the flat portion 70 of the arms or fliers 65. This flat portion 70 sets up a motion in a thin stream of coffee corresponding to the thickness of such flat portion, this motion being rotary due to the rotation of the arms 65 and also outward along the leading edge of the flat portion 70. The coffee moving along the flat portion 70 is carried outward until it strikes the leading edge of the baffles 67, whereupon it is scooped up by the plough shaped extension 66 and laid down in a ridge over the top of the trailing edge of the barrier 67.

The ridge of granulated coffee which has been ploughed over the trailing edge of the baffles 67 will lie in the path of the pusher 68. The pusher 68 will impart a rotary motion to this granulated coffee; some of the coffee will pass through the discharge opening 36, some of it will pass through the apertures 69, while other portions thereof will be pushed back inwardly and will be again subjected to the ploughing action of the extension 66.

Figure 13:
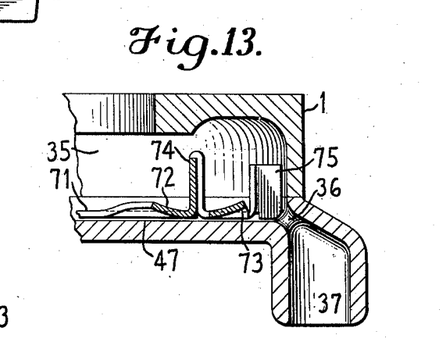
Fig. 13 is a fragmentary section similar to Fig. 10 but with a modified form of coffee treating mechanism.
Figure 14:
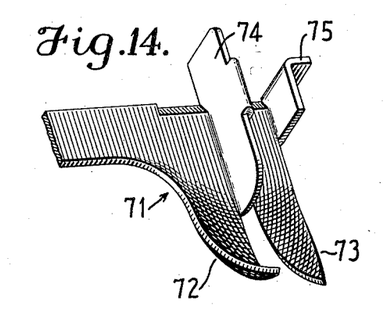
Fig. 14 is a perspective view showing the construction of the coffee treating element of Fig. 13.

Figs. 13 and 14 show another embodiment of the coffee treating mechanism wherein both barriers are omitted from the annular chamber 35. In this form of the invention fliers 71 are employed having plough shaped extensions 72 and 73 separated in front by vertical baffles 74 and having flat paddles 75 which rotate adjacent the periphery of chamber 35. As the fliers rotate through the granulated coffee and chaff a thin layer of such product moves outwardly as previously described until it meets baffle 74 whereupon it is lifted by the plough shaped extension 72 over such baffle 74 and into the path of the plough shaped extension 73. The plough shaped extension 73 is somewhat flatter than the plough shaped extension 72 and therefore ploughs back into the path of the plough shaped extension 72 only a portion of the product in its path. The balance of the product spills outwardly of the plough shaped extension 73 and into the path of the paddle or pusher 75 whereupon it is subjected to a rotary motion, some of it passing out through the opening 36 and some of it continuing in the rotary motion. It can be seen that the action of the stream being ploughed by the two members 72 and 73 intersect each other in relatively opposite directions and that that portion which spills outwardly from the extension 73 acts upon and is acted upon by the stream of coffee being rotated by the pusher 75.

Figure 15:
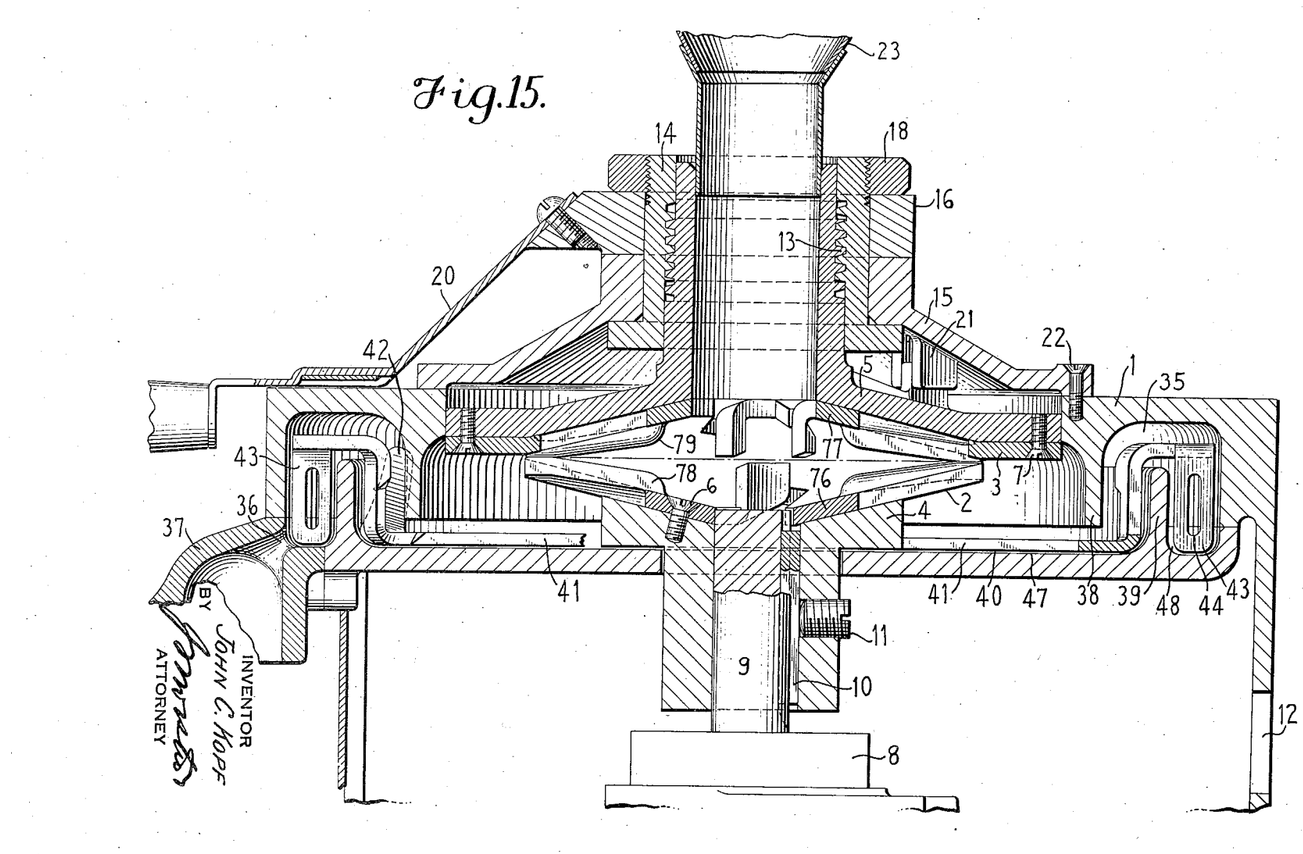
Fig. 15 shows a modification in which the coffee is finish ground, before the chaff is reduced.

Fig. 15 shows a modification in which the granulating elements 76 and 77 are provided with but single rows of teeth 78 and 79. In this form, the roasted coffee beans pass from the hopper 23 through the hollow shank of the fixed plate carrier 5 into the bite of the breaker and conveyor flights 24 and 25 thence into the bite of the teeth 76 and 77. Broken coffee is gradually reduced to a predetermined fineness and passes into the annular chamber 35 where it is treated as previously described to produce a finished homogeneous product containing practically indiscernible chaff.

Having thus described my invention, what I claim as new, novel and useful, is:

1. In a machine for granulating and treating coffee, in combination with cooperating grinding plates, means for feeding material between said plates, an annular chamber having a restricted peripheral discharge opening for receiving and discharging material thrown outwardly by said plates, a plurality of spaced annular barriers in said chamber extending from opposite sides thereof between said plates and said discharge opening, a rotatable arm in said chamber carrying an extension between the outer barrier and the outer wall of said annular chamber and adapted to move granulated coffee around the annular chamber formed by said barrier and said barrier wall and discharge a portion thereof through the discharge opening, a plough-shaped extension carried by said arm between said barriers and adapted to throw said granulated coffee over the outer barrier and lay it in a ridge on the granular coffee being rotated by the outer extension.

2. In a machine for granulating and treating coffee, in combination with cooperating grinding plates, means for feeding material between said plates, an annular chamber having a restricted peripheral discharge opening for receiving and discharging granulated coffee thrown outwardly by said plates, an annular barrier in said chamber between said plates and said discharge opening, a rotatable arm in said chamber, a plough shaped extension carried by said arm inwardly of said barrier to lift said granulated coffee over said barrier, and an extension carried by said arm outwardly of said barrier to move said material through said discharge opening.

3. In a machine for granulating and treating coffee, in combination with a rotatable grinding plate, a stationary grinding plate, means for adjusting said stationary plate toward and away from said rotatable plate to vary the fineness of the grind, means for feeding coffee between said plates, an annular chamber around said plates adapted to receive and accumulate a bulk of the ground material from said plates, and an arm in said chamber movable with said rotatable plate to rotate in said bulk of material, said arm having a cross section substantially less than said chamber whereby movement is imparted to portions of said bulk of material different from that of other contacting portions of said material for causing the coffee granules to act upon and further reduce the chaff, a restricted discharge opening for said chamber, means to prevent direct radial discharge of material from said chamber through said opening, and means rotatable with said arm to discharge portions of the bulk, after treatment by said arm, through said discharge opening.

4. In a machine for granulating and treating coffee, a pair of cooperating relatively rotatable grinding plates, means for adjusting the separation of said plates to vary the fineness of the grind, means for feeding material between said plates, an annular chamber around said plates adapted to receive and accumulate a bulk of the ground material from said plates, and an arm associated with at least one of said plates to rotate in said bulk of material, said arm having a cross section substantially less than said chamber whereby movement is imparted to portions of said bulk of material different from that of other contacting portions of said material for causing the coffee granules to act upon and further reduce the chaff, a restricted discharge opening for said chamber, means to prevent direct radial discharge of material from said chamber through said opening, and means rotatable with said arm to discharge portions of the bulk, after treatment by said arm, through said discharge opening.

5. In a machine for granulating and treating coffee, in combination with cooperating grinding plates, means for feeding bean coffee between said plates, an annular chamber around said plates adapted to receive and accumulate a bulk of the ground material from said plates, and a rotatable element in said chamber, said element being adapted to engage portions only of said bulk of material for imparting movements to said portions of said bulk of material different from that of other contacting portions of the material for causing the coffee granules to act upon and further reduce the chaff, a restricted discharge opening for said chamber, means to prevent direct radial discharge of material from said chamber through said opening, and means rotatable with said element to discharge portions of the bulk, after treatment by said element through said discharge opening.

6. In a machine for granulating and treating coffee, a pair of cooperating grinding elements, means for rotating at least one of said elements, an annular chamber adapted to receive and accumulate a bulk of the ground material from said elements, and an arm connected with the rotating element and extending into said chamber, said arm having a cross section substantially less than that of said chamber whereby movement is imparted to portions of said bulk of material different from that of other contacting portions of said material for causing the coffee granules to act upon and further reduce the chaff, a restricted discharge opening for said chamber, means to prevent direct radial discharge of material from said chamber through said opening, and means rotatable with said arm to discharge portions of the bulk, after treatment by said arm, through said discharge opening.

7. In a machine for granulating and treating coffee, in combination with cooperating grinding plates, means for feeding material between said plates, an annular chamber having a restricted peripheral discharge opening for receiving and discharging granulated coffee thrown outwardly by said plates, an annular barrier in said chamber between said plates and said discharge opening, means rotatable in said chamber to engage a portion of the material accumulated therein for imparting movement to a portion of said material different from that of the remainder thereof so as to cause the coffee granules to act upon and further reduce the chaff, and means to impel the material thus treated over said barrier for discharging the same.

8. In a machine for granulating and treating coffee, in combination with cooperating grinding plates, means for feeding material between said plates, an annular chamber having a restricted peripheral discharge opening for receiving and discharging granulated coffee thrown outwardly by said plates, an annular barrier in said chamber between said plates and said discharge opening, means rotatable in said chamber to engage a portion of the material accumulated therein for imparting movement to a portion of said material different from that of the remainder thereof so as to cause the coffee granules to act upon and further reduce the chaff, means to impel the material thus treated over said barrier, and means engaging the material after passage over said barrier for impelling the same through said discharge opening.

9. In a machine for granulating and treating coffee, in combination with cooperating grinding plates, means for feeding material between said plates, an annular chamber having a restricted peripheral discharge opening for receiving and discharging granulated coffee thrown outwardly by said plates, an annular barrier in said chamber between said plates and said discharge opening, an arm rotatable in said chamber, said arm having a cross section less than that of said chamber whereby it engages only a portion of the material therein for imparting differential movement to said material so as to cause the coffee granules to act upon and further reduce chaff, means associated with said arm for impelling the material thus treated over said barrier and means to discharge the material through said discharge opening.

10. In a machine for granulating and treating coffee, in combination with cooperating grinding plates, means for feeding material between said plates, an annular chamber having a restricted peripheral discharge opening for receiving and discharging granulated coffee thrown outwardly by said plates, an annular barrier in said chamber between said plates and said discharge opening, an arm rotatable in said chamber, said arm having a cross section less than that of said chamber whereby it engages only a portion of the material therein for imparting differential movement to said material so as to cause the coffee granules to act upon and further reduce chaff, means associated with said arm for impelling the material thus treated over said barrier, and means to engage and impel through said discharge opening the material which has passed over said barrier.

JOHN C. KOPF.